(12) United States Patent
Kim et al.

(10) Patent No.: US 8,259,047 B2
(45) Date of Patent: Sep. 4, 2012

(54) HORIZONTAL STRIPE LIQUID CRYSTAL DISPLAY DEVICE

(75) Inventors: Dong Gyu Kim, Yongin-si (KR); Jong Woong Chang, Cheonan-si (KR)

(73) Assignee: Samsung Electronics, Co., Ltd., Suwon-Si, Gyeonggi-Do (KR)

( * ) Notice: Subject to any disclaimer, the term of this patent is extended or adjusted under 35 U.S.C. 154(b) by 754 days.

(21) Appl. No.: 12/360,363

(22) Filed: Jan. 27, 2009

(65) Prior Publication Data
US 2009/0128470 A1    May 21, 2009

Related U.S. Application Data

(63) Continuation of application No. 11/527,115, filed on Sep. 26, 2006, now Pat. No. 7,495,737.

(30) Foreign Application Priority Data

Feb. 6, 2006    (KR) ............................. 2006-0011110

(51) Int. Cl.
*G09G 3/36*    (2006.01)
(52) U.S. Cl. ........................................... 345/87; 345/92
(58) Field of Classification Search ..................... 345/87, 345/90, 92
See application file for complete search history.

(56) References Cited

U.S. PATENT DOCUMENTS

| | | | | |
|---|---|---|---|---|
| 2005/0253836 A1 * | 11/2005 | Kim et al. | ...................... | 345/212 |
| 2006/0139274 A1 * | 6/2006 | Song et al. | ...................... | 345/90 |
| 2007/0018927 A1 * | 1/2007 | Kim | ................... | 345/92 |
| 2008/0117150 A1 * | 5/2008 | Tak et al. | ....................... | 345/87 |

FOREIGN PATENT DOCUMENTS

| | | |
|---|---|---|
| JP | 09-146112 | 6/1997 |
| JP | 11-045072 | 2/1999 |
| JP | 11-133927 | 5/1999 |
| JP | 11-149087 | 6/1999 |
| JP | 11-305243 | 11/1999 |
| JP | 2001-281690 | 10/2001 |
| JP | 2002-090770 | 3/2002 |
| JP | 2003-043948 | 2/2003 |
| JP | 2003-156763 | 5/2003 |
| JP | 2004-093734 | 3/2004 |
| JP | 2004-341539 | 12/2004 |
| JP | 2005534974 | 11/2005 |
| KR | 10-2005-0041355 A | 5/2005 |
| KR | 2005054215 A * | 6/2005 |
| WO | WO9500874 | 1/1995 |

* cited by examiner

*Primary Examiner* — Adam R Giesy
(74) *Attorney, Agent, or Firm* — F. Chau & Associates, LLC.

(57) ABSTRACT

A liquid crystal display device for improving picture quality includes a common electrode formed on a first substrate, gate lines and data lines formed on a second substrate bonded to the first substrate by a sealing member with liquid crystals disposed therebetween, thin film transistors connected to the gate lines and to the data lines, pixel electrodes formed in subpixel regions, each pixel electrode having a long side in a direction of the gate lines and having a short side in a direction of the data lines fanout lines for supplying a driving signals from the driving chips to the data lines, first conductive spacers formed between the fanout lines connected to different driving chips, for supplying a common voltage to the common electrode, and second conductive spacers formed between the fanout lines connected to the same driving chip, for supplying the common voltage to the common electrode.

23 Claims, 10 Drawing Sheets

HORIZONTAL STRIPE LIQUID CRYSTAL DISPLAY DEVICE

CROSS REFERENCE TO RELATED APPLICATION

This application is a continuation of U.S. application Ser. No. 11/527,115 filed on Sep. 26, 2006 now U.S. Pat. No. 7,495,737, the disclosure of which is herein incorporated by reference in its entirety.

BACKGROUND OF THE INVENTION

1. Field of the Invention

The present invention relates to a liquid crystal display device, and more particularly, to a liquid crystal display device having horizontal stripes of same-color subpixels using the same gate lines, and capable of improving picture quality by preventing crosstalk.

2. Description of the Related Art

A liquid crystal display ("LCD") device displays an image through a pixel matrix using electro-optical properties of liquid crystals. Each pixel (three colored subpixels) of the LCD device represents a desired color by a combination of red, green and blue subpixels controlling light transmittance by varying the arrangement of the liquid crystals in response to a data signal. Each subpixel contains liquid crystals that are controlled by a voltage difference (electric field) applied to a pixel electrode as a data signal supplied through a thin film transistor ("TFT") (a switching element) and a common voltage supplied to a common electrode. The TFT is turned ON by a gate-ON voltage supplied via a gate line, thus passing the data signal supplied via a data line to the pixel electrode, and is turned OFF by a gate-OFF voltage supplied via the gate line. The gate-OFF voltage applied to the gate line should be kept stable so that the data signal charged to the pixel electrode can be controlled.

However, a ripple phenomenon occurs such that the common voltage swings along the data signal supplied to the data line(s) due to a coupling by a parasitic capacitance between the data line(s) and the common electrode overlapping each other with the liquid crystals disposed therebetween, resulting in crosstalk. Especially when a specific image data pattern having a severely biased polarity is displayed on a screen, the crosstalk becomes more severe and the ripple component of the common voltage is increased.

SUMMARY OF THE INVENTION

The R, G and B subpixels of each pixel are arranged in a vertical sequence and are driven by the same data line, and subpixels of the same color (of different pixels) are horizontally arranged in a horizontal stripe and are driven by the same gate line. The LCD device reduces the number of data lines to one third compared to a conventional "vertical stripe" LCD device.

An aspect of the present invention provides an LCD device capable of improving picture quality by preventing crosstalk.

An exemplary embodiment of the invention provides a liquid crystal display (LCD) device. The LCD device includes a common electrode formed on a first substrate, gate lines and data lines formed on a second substrate bonded to the first substrate by a sealing member with liquid crystals disposed therebetween and the data lines and gate lines intersect each other, thin film transistors connected to the gate lines and to the data lines, pixel electrodes formed in subpixel regions each having a long side in the direction of the gate lines and having a short side in the direction of the data lines and connected to the thin film transistors, driving chips mounted on circuit films, for driving the data lines, fanouts (fanout lines) for supplying a driving signal from the driving chips to the data lines, first conductive spacers (first conductive spacers, extending and conducting between the first and second substrates) formed between the fanout lines connected to different driving chips, for supplying a common voltage to the common electrode, and second conductive spacers (first conductive spacers, extending and conducting between the first and second substrates) formed between the fanout lines connected to the same driving chip, for supplying the common voltage to the common electrode.

The LCD device further includes a common voltage supply line formed perpendicular to the fanout lines, for connecting the first and second conductive spacers to each other.

The common voltage supply line is formed in plural numbers so that it can be separated according to the fanout lines connected to the same driving chip.

Different common voltages are supplied to different (separate) common electrode corresponding to regions corresponding to the fanout lines.

The second conductive spacers are adjacent to the fanout line positioned at the center among the fanout lines connected to the same driving chip.

The LCD device further includes a plurality of storage lines formed along the short side via the subpixel region.

The LCD device further includes storage supply lines formed according to the fanout lines connected to the same driving chip and connected in common to the storage lines.

The storage supply lines supply different storage voltages according to storage lines positioned in regions corresponding to the fanout lines connected to the same driving chip.

The storage supply lines perpendicular to the fanout lines are formed to overlap the sealing member.

The sealing member includes a soft spacer.

The LCD device further includes a passivation layer formed of an organic insulating layer to cover the fanout lines with a thickness capable of buffering pressure of the sealing member.

Another exemplary embodiment of the invention provides an a liquid crystal display (LCD) device according to the present invention, the LCD device includes a common electrode formed on a first substrate, a gate line and a data line formed on a second substrate bonded to the first substrate by a sealing member with liquid crystals disposed therebetween and the data lines intersect each other, a thin film transistor connected to the gate line and to the data line, a pixel electrode formed in a subpixel region having a long side in a direction of the gate line and having a short side in a direction of the data line and connected to the thin film transistor, a plurality of storage lines formed along the short side via the subpixel region, and a storage supply line that is connected in common to the plurality of storage lines and overlaps at least a part of the sealing member.

The LCD device further includes a conductive spacer formed on the second substrate, for supplying a common voltage to the common electrode, and a feedback dot adjacent to the conductive spacer, for feeding back the common voltage.

A compensation signal having a phase opposite to the common voltage fed back through the feedback dot is supplied to the storage line.

The storage supply line is formed to have a width ranging from 4 mm to 6 mm.

BRIEF DESCRIPTION OF THE DRAWINGS

The above and other features of the present invention will become more apparent to persons skilled in the art from the following detailed description when taken in conjunction with the accompanying drawings, in which.

DETAILED DESCRIPTION OF THE PREFERRED EMBODIMENTS

Figure 1:
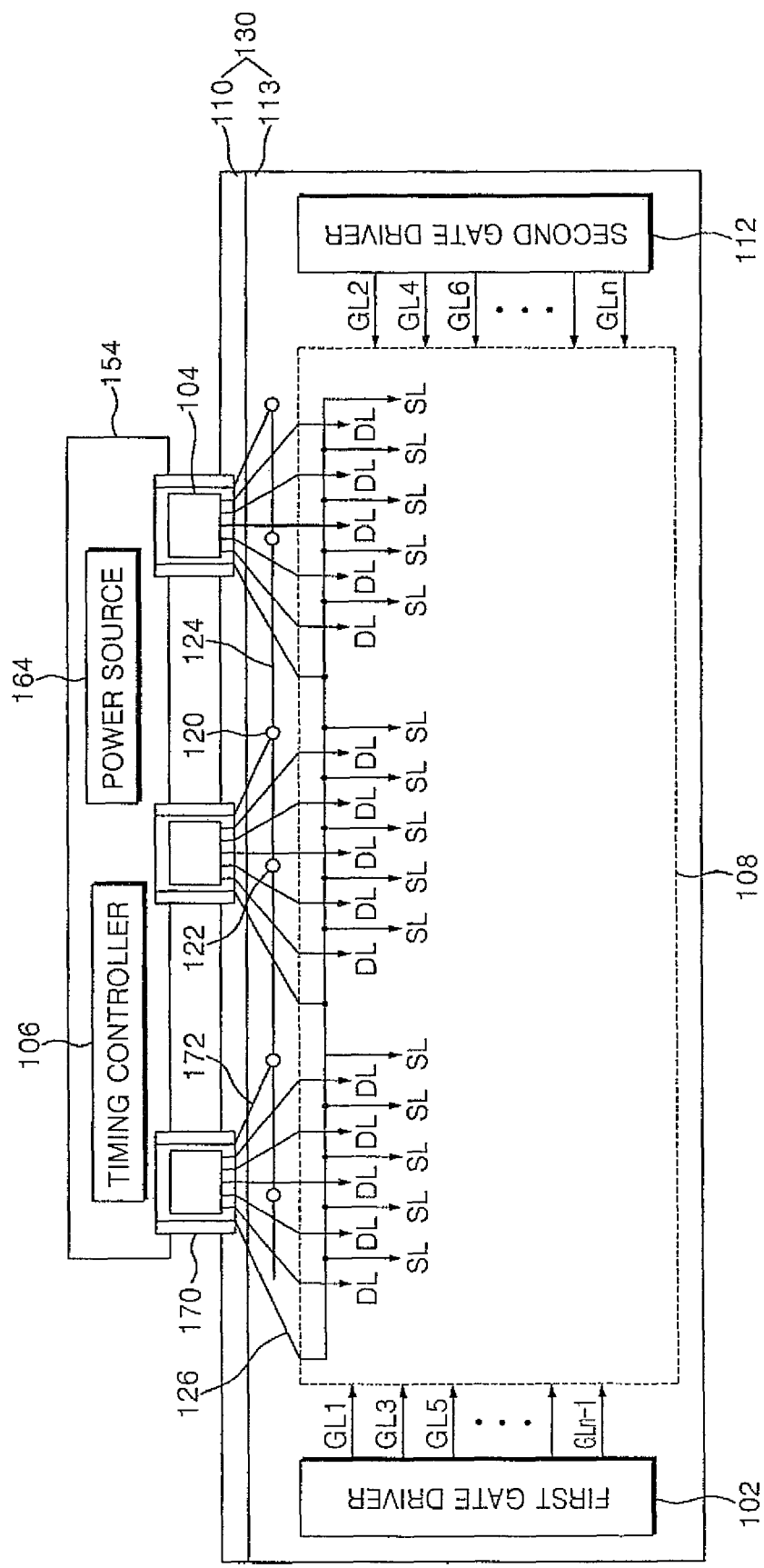
FIG. 1 is a schematic view of an LCD device according to a first exemplary embodiment of the present invention.

FIG. 1 is a schematic view of a liquid crystal display (LCD) device according to a first exemplary embodiment of the present invention.

Referring to FIG. 1, the LCD device includes an LCD panel 130 in which first and second gate drivers 102 and 112 for driving gate lines GL1 to GLn of the image display unit (pixel array) 108 are formed, circuit films (e.g., tape carrier packages or chip-on-films) 170 have data driving chips 104 mounted thereon for driving data lines DL of the image display unit (pixel array) 108 and are connected between a printed circuit board (PCB) 154 and the LCD panel 130. A timing controller 106 is mounted on the PCB 154.

The first and second gate drivers 102 and 112 are located at opposite sides of the image display unit 108 and respectively drive the odd and even gate lines among GL1 to GLn. For example, the first gate driver 102 drives odd gate lines GL1, GL3, . . . , Gn–1 and the second gate driver 112 drives even gate lines GL2, GL4, . . . , GLn. The first and second gate drivers 102 and 112 are comprised of shift registers (e.g., including a plurality of thin film transistors, TFTs) and are mounted in a non-display region i.e., outside of the image display unit (pixel array) 108. Therefore, the first and second gate drivers 102 and 112 may be formed together with pixel switching TFTs and a plurality of signal lines DL, GL and SL of the image display unit (pixel array) 108. The first and second gate drivers 102 and 112 sequentially drive the gate lines GL1 to GLn of the image display unit 108 by using gate control signals received from the timing controller 106 and gate-ON and gate-OFF voltages received from a power source 164.

A plurality of data driving chips 104 for separately driving sets of the data lines DL of the image display unit 108 are respectively mounted on the plurality of circuit films 170. The circuit films 170 are attached to the LCD panel 130 and to the PCB 154 through anisotropic conductive films. Anisotropic Conductive Film (ACF) is a material used for interconnecting LCD drive-use semiconductor chip-mounted tape carrier package (TCP) circuits and the electrodes of LCD panels, as well as for connecting TCP circuits to printed wiring board circuits. Tape carrier packages or chip-on-films are used as the circuit films 170 on which the data driving chips 104 are mounted. The data driving chips 104 may be directly mounted on a TFT substrate 110 of the LCD panel 130 by using a chip-on-glass technique without using the circuit films 170. The data driving chips 104 convert digital data from the timing controller 106 into an analog data signals by using a gamma voltage from a gamma voltage generator (or gray voltage generator) (not shown) and supply the analog data signals to the data lines DL in synchronization with each horizontal period during which the gate lines GL1 to GLn of the image display unit 108 are driven.

The timing controller 106 mounted on the PCB 154 controls the data driving chips 104 and the first and second gate drivers 102 and 112. A data signal and a plurality of data control signals from the timing controller 106 are supplied to the data driving chips 104 via the PCB 154 and via the circuit films 170, and a plurality of gate control signals from the timing controller 106 are supplied to the first and second gate drivers 102 and 112 via the PCB 154, via the circuit films 170, and via the TFT substrate 110 of the LCD panel 130.

The image display unit (pixel array) 108 of the LCD panel 130 displays images by activating a plurality of pixels arrayed in a matrix format, each pixel consisting of red (R), green (G), and blue (B) subpixels. The image display unit (pixel array) 108 is formed by bonding the TFT substrate 110, on which TFTs are formed (to switchably control each of the R, G and B subpixels), to a color filter substrate 113 where color filters are formed (for each of the R, G and B subpixels), with liquid crystal molecules disposed therebetween. The R, G and B subpixels are arranged in a vertical sequence and subpixels of the same color are horizontally arranged in a horizontal stripe. By the vertical arrangement of the R, G and B subpixels on the image display unit (pixel array) 108, the LCD device reduces the number of data lines DL to one third of the data lines of a comparable LCD device in which the R, G and B subpixels are alternated in a horizontal direction. As a result, the number of data driving chips 104 for driving the data lines DL is reduced by two thirds. Although the number of the gate drivers 102 and 112 increases (because the number of gate lines GL1 to GLn increases) as the number of data lines DL decreases (due to the vertical arrangement of the R, G and B subpixels), since the circuit configuration of the gate drivers 102 and 112 is simpler than that of the data driving chips 104, manufacturing cost can be reduced. Since the gate drivers 102 and 112 are mounted within the TFT substrate 110 using an amorphous silicon thin film, the manufacturing cost of the LCD device having fewer data lines, and more gate lines according the embodiments of the present invention can be greatly reduced compared to that of the conventional LCD device.

Figure 2:
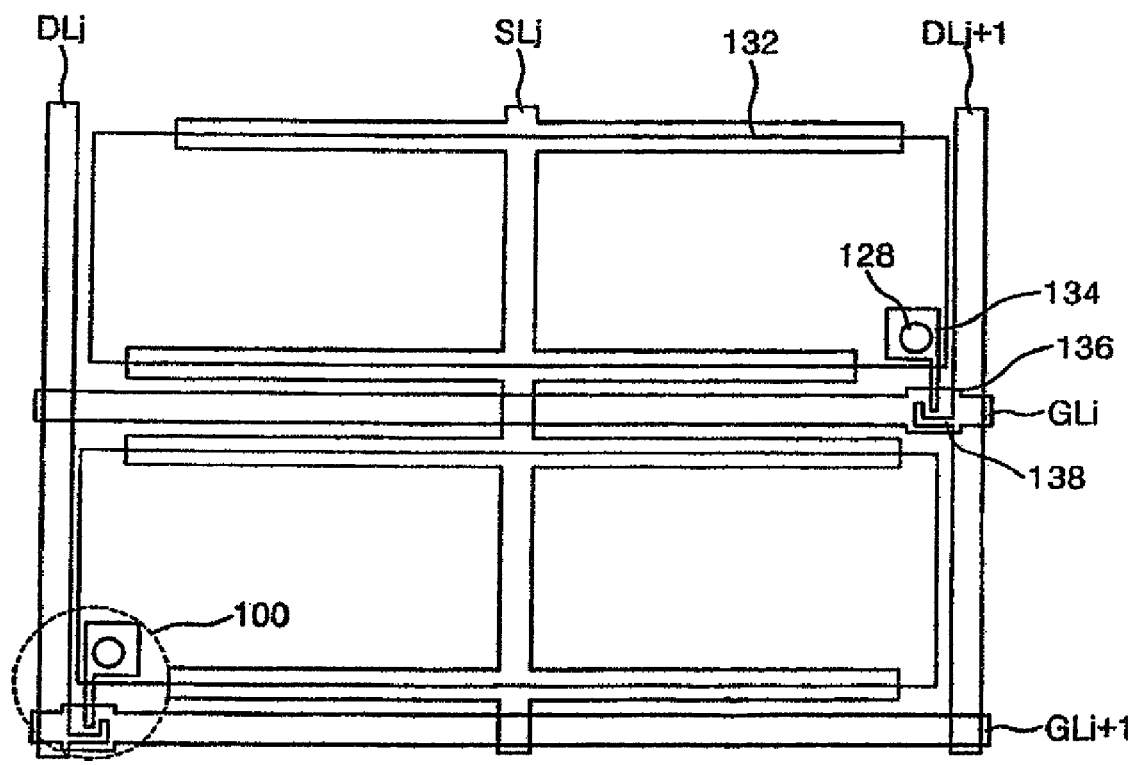
FIG. 2 is a plan view illustrating two subpixels in a TFT substrate of the LCD device of FIG. 1.

FIG. 2 is a plan view illustrating two subpixels in a TFT substrate of the LCD device of FIG. 1.

Each subpixel in the image display unit (pixel array) 108 on the TFT substrate 110 includes, as shown in FIG. 2, a (horizontally elongated rectangular) pixel electrode 132 formed in a subpixel region defined by an intersection of a gate line GL and of a data line DL, and a thin film transistor (TFT) 100 connected between the gate line GL, the data line DL and the pixel electrode 132.

The gate line GL and the data line DL are formed perpendicular to each other on an insulating substrate with a gate insulating layer disposed therebetween. Each subpixel region is defined by an intersection of the gate line GL and the data line DL. A storage line SL is formed on the insulating substrate in parallel with the data line DL to pass through the center of each subpixel (e.g., along a short side of the subpixel).

The TFT 100 includes a gate electrode 136 connected to the gate line GL, a source electrode 138 connected to the data line DL, a drain electrode 134 connected to the pixel electrode 132, and a semiconductor layer connected to the source electrode 138 and to the drain electrode 134. The semiconductor layer includes an active layer for forming a channel between the source electrode 138 and the drain electrode 134, and an ohmic contact layer for an ohmic contact of the active layer, the source electrode 138 and the drain electrode 134. The channel in the semiconductor layer is formed over a gate electrode 136. The semiconductor layer is formed under the data line DL and the storage line SL. The TFTs 100 formed in two subpixel regions that are vertically adjacent to each other (as shown in FIG. 2) are respectively connected to right and left data lines which have opposite polarity. The connecting directions of the TFTs connected to the data lines DL alternate along a vertical direction. For example, the TFTs 100 of odd horizontal lines connected to the odd gate lines GLi are connected to the pixel electrodes 132 on the left of the data line DLj+1. In other words, the subpixels in odd horizontal lines have TFTs 100 connected to the data lines DLj+1 on the right side of the subpixel. The TFTs 100 of even horizontal lines connected to the even gate lines GLi+1 are connected to the pixel electrodes 132 on the right of the data line DLj. In other words, the subpixels in even horizontal lines have TFTs 100 connected to the data lines DLj on the left side of the subpixel. Accordingly, the polarity of the data signal supplied to each of the data lines DLj to DLj+1 is opposite to that of the data signal supplied to its adjacent data lines DL. Even if the polarity of the data signal is inverted only on a frame basis, the pixel electrode 132 is always charged by the data signal having a polarity opposite to the polarity of horizontally and vertically adjacent pixel electrodes 132 (e.g., is driven by dot inversion).

The pixel electrode 132 is connected to the drain electrode 134 of the TFT 100 through a contact hole 128 (penetrating a passivation layer). An electric field is formed between the pixel electrode 132 and a common electrode at the color filter substrate 113, to arrange liquid crystal molecules therebetween. The pixel electrode 132 overlaps the storage line SL with at least one insulating layer disposed therebetween, thereby forming a storage capacitor. The storage capacitor can keep the data signal charged to the pixel electrode 132 stable even after the TFT is turned OFF. As illustrated in FIG. 1 (and FIG. 3), the storage lines SL constituting the storage capacitor receive a storage voltage from the power source 164 through a storage supply line 126 connected to common storage pads 150 that are connected to the leftmost output pads of the respective circuit films 170.

The common electrode together with the pixel electrode 132 establishes an electric field for orienting the liquid crystals, and may be formed on the color filter substrate 113.

Figure 3:
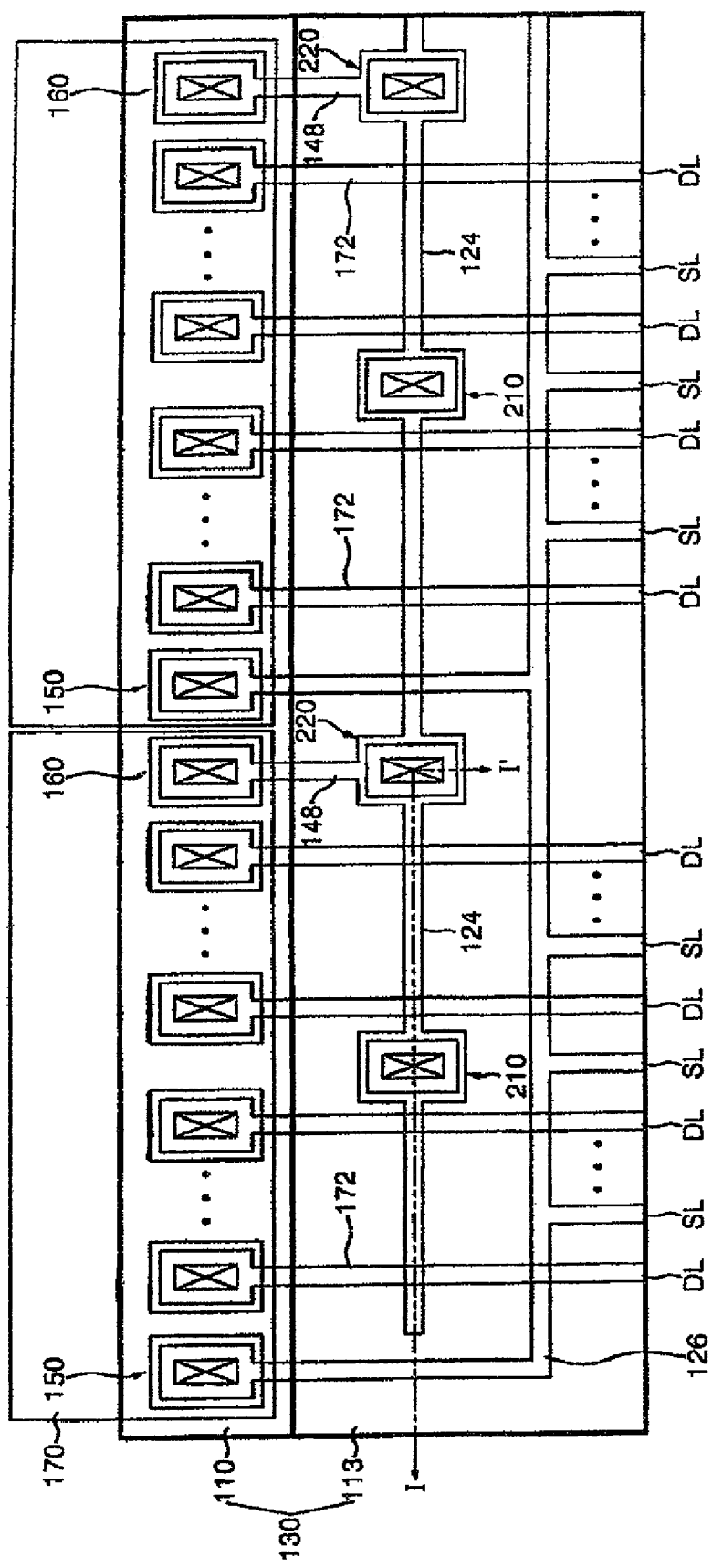
FIG. 3 is a plan view illustrating pads connected to a circuit film and to first and second conductive spacers in the LCD device in FIG. 1.

FIG. 3 is a plan view illustrating pads connected to a circuit film and to first and second conductive spacers in the LCD device of FIG. 1.

Figure 4A:
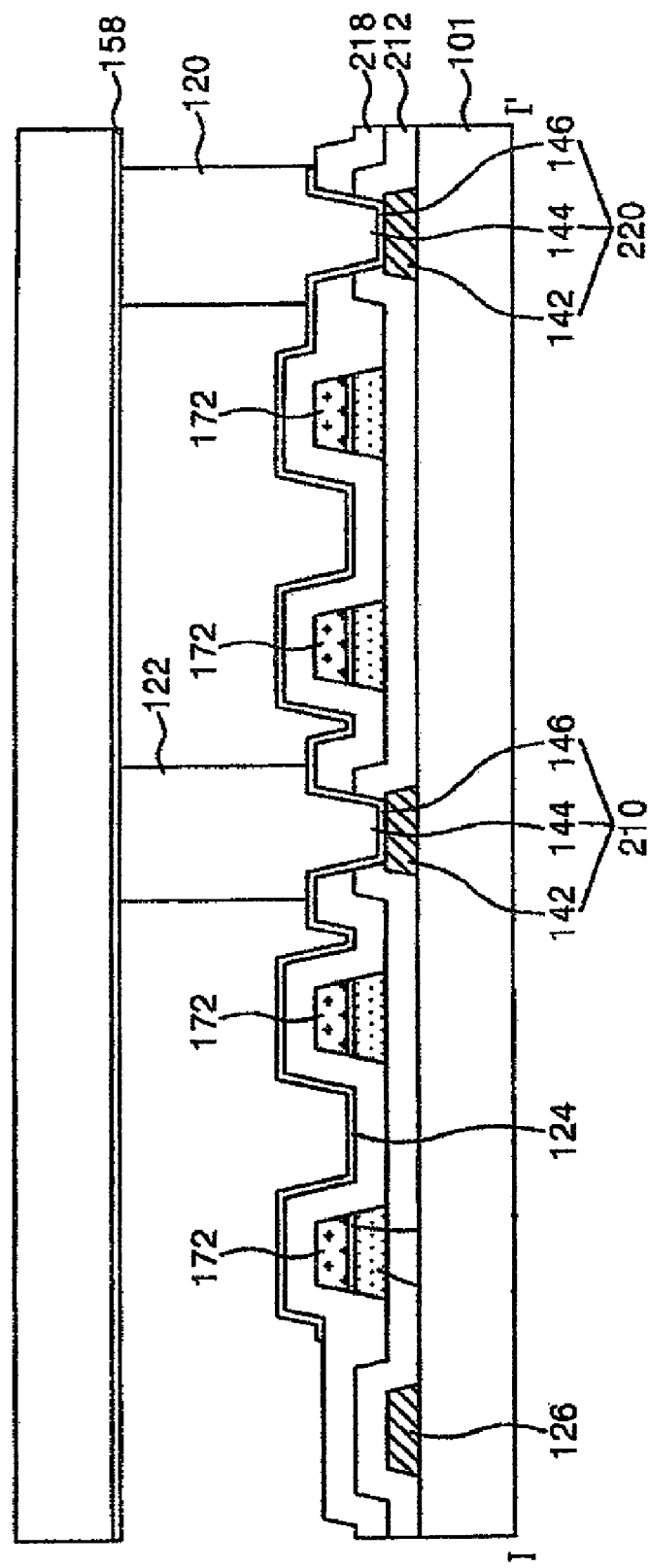
FIGS. 4A and 4B are alternative cross-sectional views taken along section line I-I' in FIG. 3 illustrating alternative embodiments of an upper pad electrode 146 connecting the first and second conductive spacers.
Figure 4B:
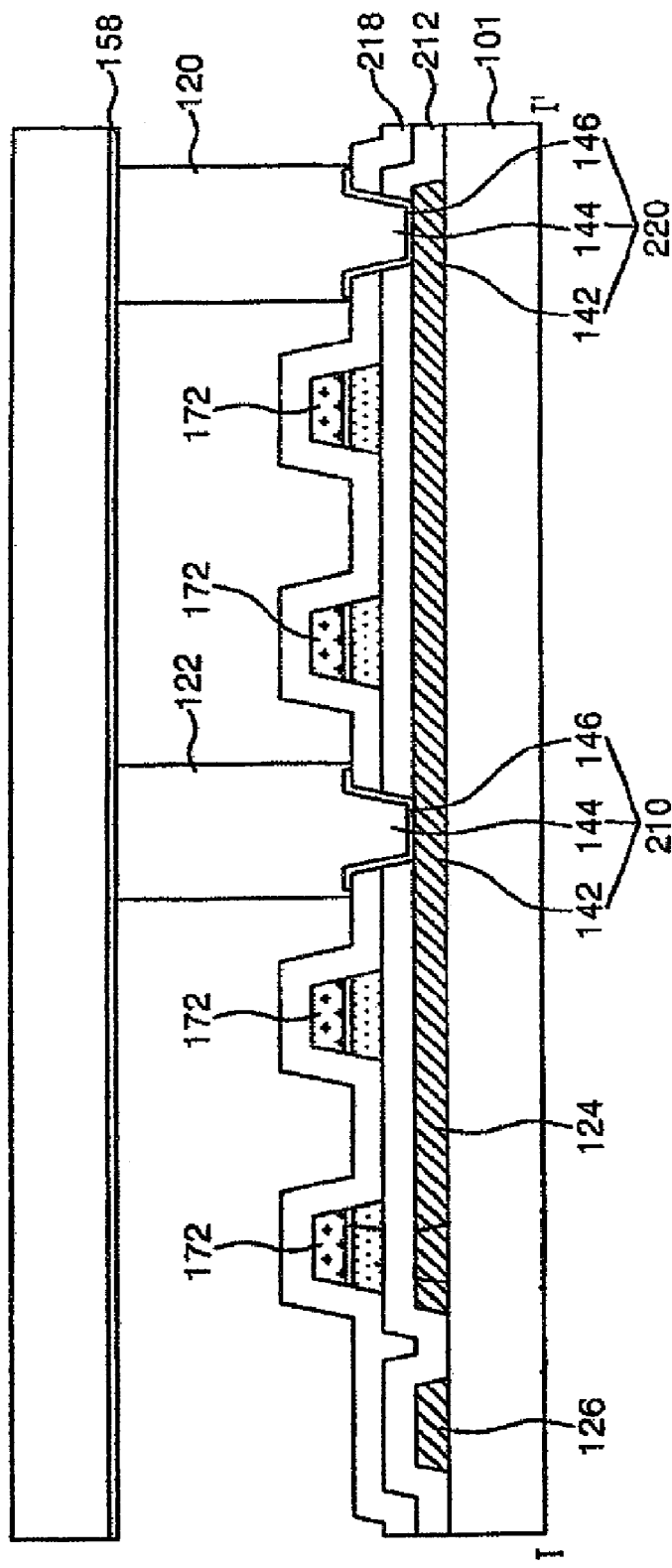

FIGS. 4A and 4B are alternative cross-sectional views taken along section line I-I' in FIG. 3 illustrating alternative embodiments of an upper pad electrode 146 connecting the first and second conductive spacers.

As shown in FIGS. 3, 4A and 4B, a common electrode 158 receives a common voltage from the power source 164, via a common voltage input pad 160 connected to the rightmost output pad of each of the circuit films 170, a first common voltage supply line 148, a first common voltage pad 220, and a first conductive spacer 120. The first common voltage pad 220 is formed between data fanout lines 172 connected to each of the several data driving chips 104 (FIG. 1). The first conductive spacer 120 is formed on the first common voltage pad 220.

The common electrode 158 also receives the common voltage from the power source 164, via a second common voltage supply line 124 connected to the first common voltage pad 220, a second common voltage pad 210, and a second conductive spacer 122. The second common voltage supply line 124 is formed to cross (under or over) the plurality of data fanout lines 172 connected to the plurality of data lines DL, and so, the second common voltage supply line 124 is formed on a different plane (layer) from the data fanout lines 172. For a first example, the second common voltage supply line 124 may be formed of the same metal layer as an upper pad electrode 146 on a passivation layer 218 (as shown in FIG. 4A); or for a second example, the second common voltage supply line 124 may be formed of the same metal layer as a lower pad electrode 142 on a lower substrate 101 (as shown in FIG. 4B). The second common voltage supply line 124 is formed to cross (over or under) the adjacent data fanout lines 172 so that the first and second conductive spacers 120 and 122 are electrically connected to each other, thereby preventing the common voltage from being delayed or rippled.

The second common voltage pad 210 is formed between the data fanout lines 172 connected to the same data driving chip 104 (FIG. 1). The second common voltage pad 210 is formed to be adjacent to the data fanout line 172 positioned at the center among the data fanout lines 172 connected to the same data driving chip 104. The second conductive spacer 122 is formed on the second common voltage pad 210. Each of the first and second common voltage pads 220 and 210 includes a lower pad electrode 142 (formed of the same metal as the gate line GL on the same plane), a pad contact hole 144 (penetrating a gate insulating layer 212 and the passivation layer 218 that are formed to cover the lower pad electrode 142), and an upper pad electrode 146 (electrically connected to the lower pad electrode 142 through the pad contact hole 144.

The LCD device of the present invention having a structure in which the number of data lines DL is decreased can compensate for a distortion of the common voltage by the second common voltage pad 210 and the second conductive spacer 122 formed between the fanout lines 172.

Figure 5:
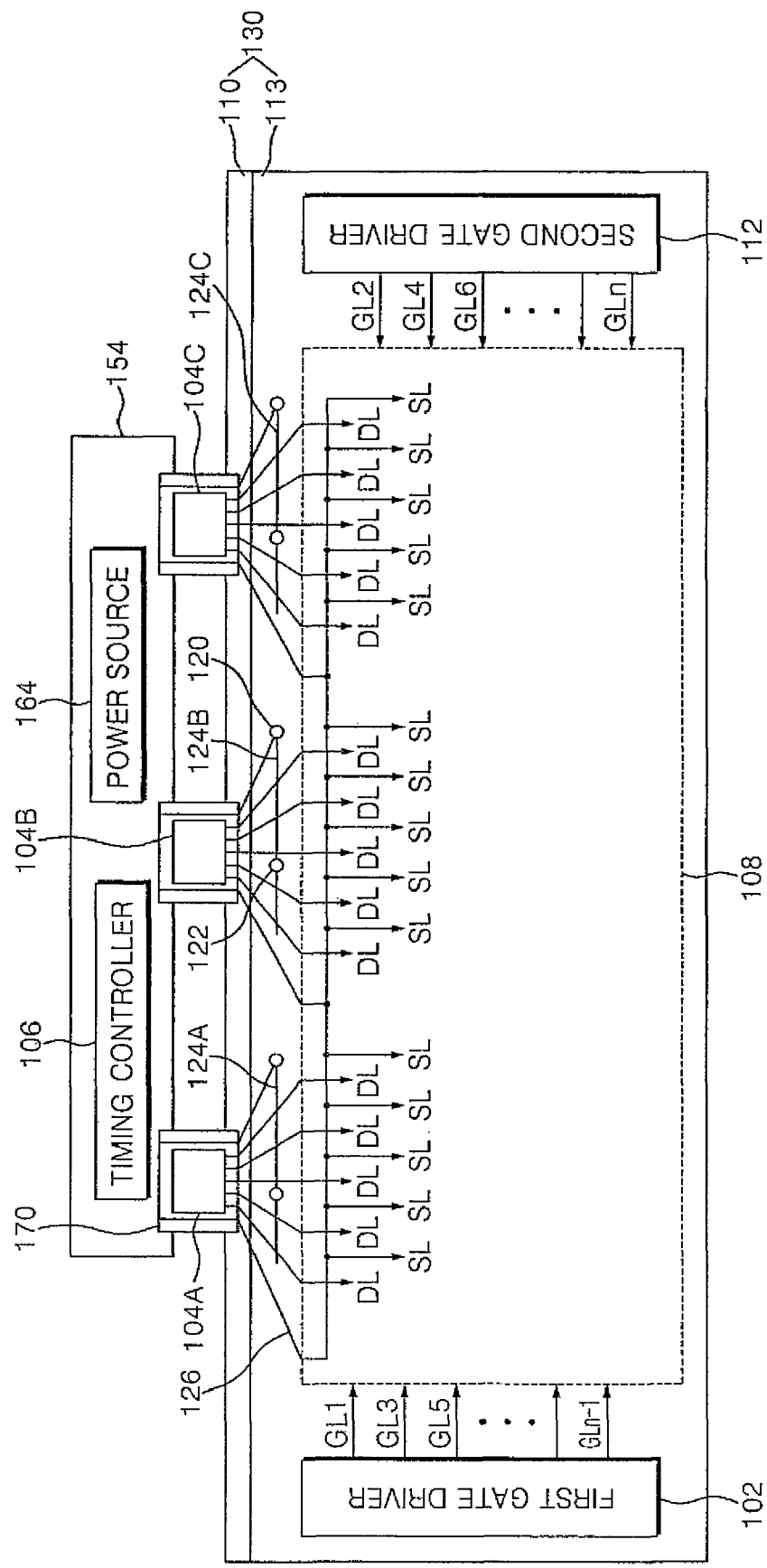
FIG. 5 is a schematic view of an LCD device according to a second exemplary embodiment of the present invention.

FIG. 5 is a schematic view of an LCD device according to a second exemplary embodiment of the present invention.

The LCD device of FIG. 5 has the same elements as the LCD device of FIG. 1, except that second common voltage supply line is divided according to each data driving chip. Therefore, a redundant detailed description of the same elements will be omitted.

The second common voltage supply line 124 is formed perpendicular to the plurality of data fanout lines 172 connected to the plurality of data lines DL. Here, the second common voltage supply line 124 is segmented according to the data fanout lines 172 connected to each data driving chip 104. For example, the first to third common voltage supply lines 124A, 124B and 124C are separated from each other and respectively cross (over or under) the data fanout lines 172 connected to first to third data driving chips 104A, 104B and 104C. The total capacitance of parasitic capacitors connected in parallel between the data fanout line 172 connected to any one of the first to third data driving chips 104A, 104B and 104C and the second common voltage supply line 124 is less than that of parasitic capacitors connected in parallel between all the data fanout lines 172 shown in FIG. 2 and the single second common voltage line 124. Therefore, an RC (resistorcapacitor) delay difference of the data fanout line 172 is eliminated and thus a distortion of the data signal can be reduced.

Moreover, since the second common voltage supply lines 124 (124A, 124 B, etc.) are separated according to the data driving chips 104, the common voltage can be differently supplied according to each of the data driving chips 104. Therefore, if the degree of distortion in the common electrode 158 differs according to the location of the segment of second common voltage supply line 124, the common voltage may be differently supplied according to the degree of distortion.

The LCD device of the present invention having a structure in which the number of data lines DL is decreased can compensate for a distortion of the common voltage by the second common voltage pad 210 and the second conductive spacer 122 formed between the fanout lines 172. Furthermore, since the second common voltage supply line 124 is segmented, each segment of the second common voltage supply line 124 being associated with one of the data driving chips, the common voltage can be differently supplied.

Figure 6:
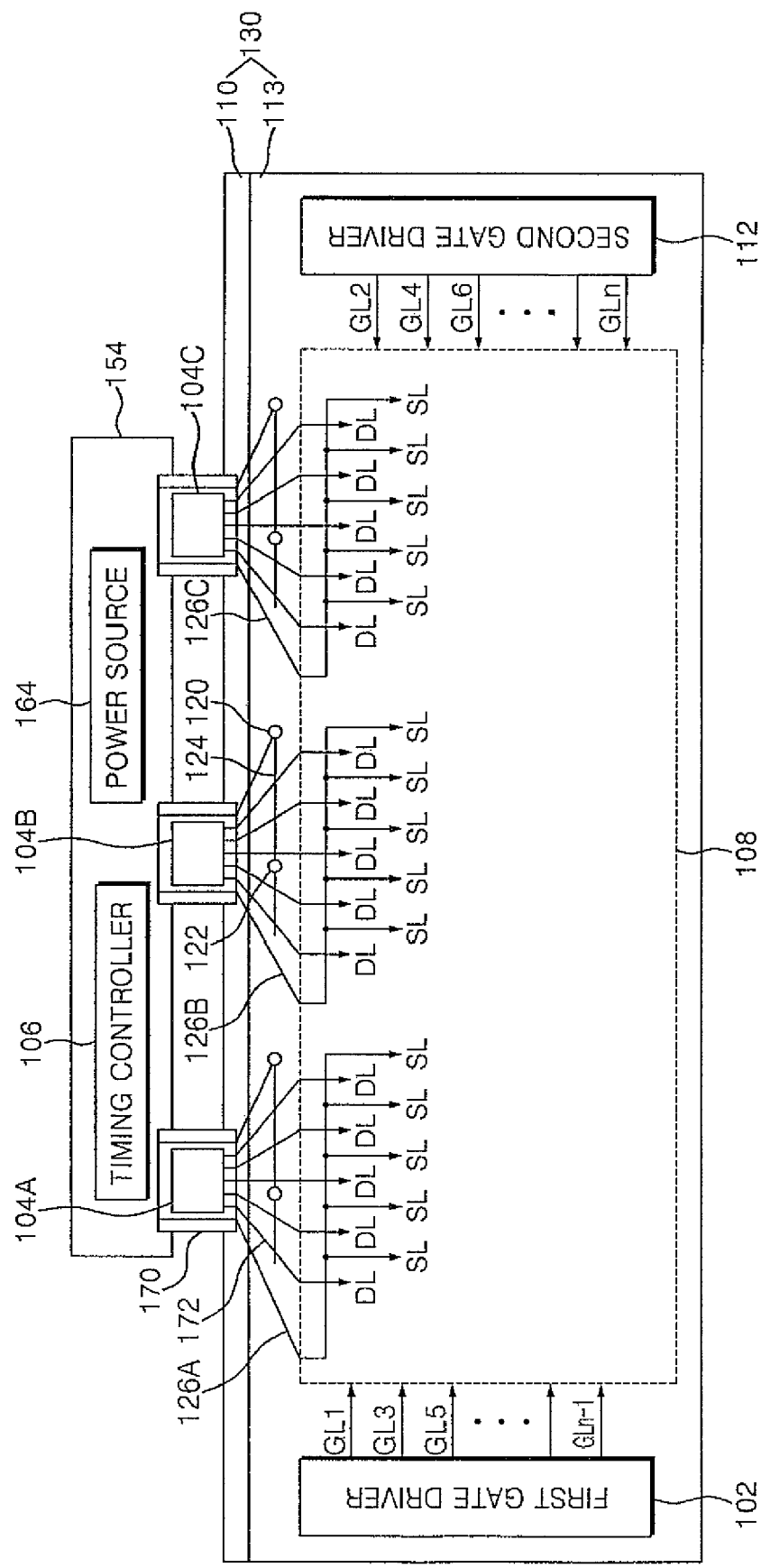
FIG. 6 is a schematic view of an LCD device according to a third exemplary embodiment of the present invention.

FIG. 6 is a schematic view of an LCD device according to a third exemplary embodiment of the present invention.

The LCD device of FIG. 6 has the same elements as the LCD device of FIG. 5, except that the storage supply line is divided (segmented) each segment corresponding to one of the data driving chips. Therefore, a detailed description of the same elements will be omitted.

The storage supply line 126 is formed to cross (over or under) the plurality of data lines DL and to be divided (segmented) with each segment of the storage supply line 126 corresponding to one of the data driving chips 104. For example, first, second, and third storage supply lines 126A, 126B and 126C respectively correspond to the first, second and third data driving chips 104A, 104B and 104C, and are separated from each other. The respective first, second and third storage supply lines 126A, 126B and 126C independently supply a storage voltage to the storage lines SL connected thereto. If there is a deviation in a storage voltage corresponding to a location of the image display unit 108, the first, second and third storage supply lines 126A, 126B and 126C may differently supply the storage voltage to the corresponding storage lines SL.

The LCD device of the present invention having a structure in which the number of data lines DL is decreased can compensate for a distortion of the common voltage by the second common voltage pad and the second conductive spacer formed between the fanout lines 172. Furthermore, since the second common voltage supply line is segmented, according to the data driving chips, the common voltage can be differently supplied. In addition, since the storage supply line is segmented according to the data driving chips, the storage voltage can be differently supplied.

Figure 7:
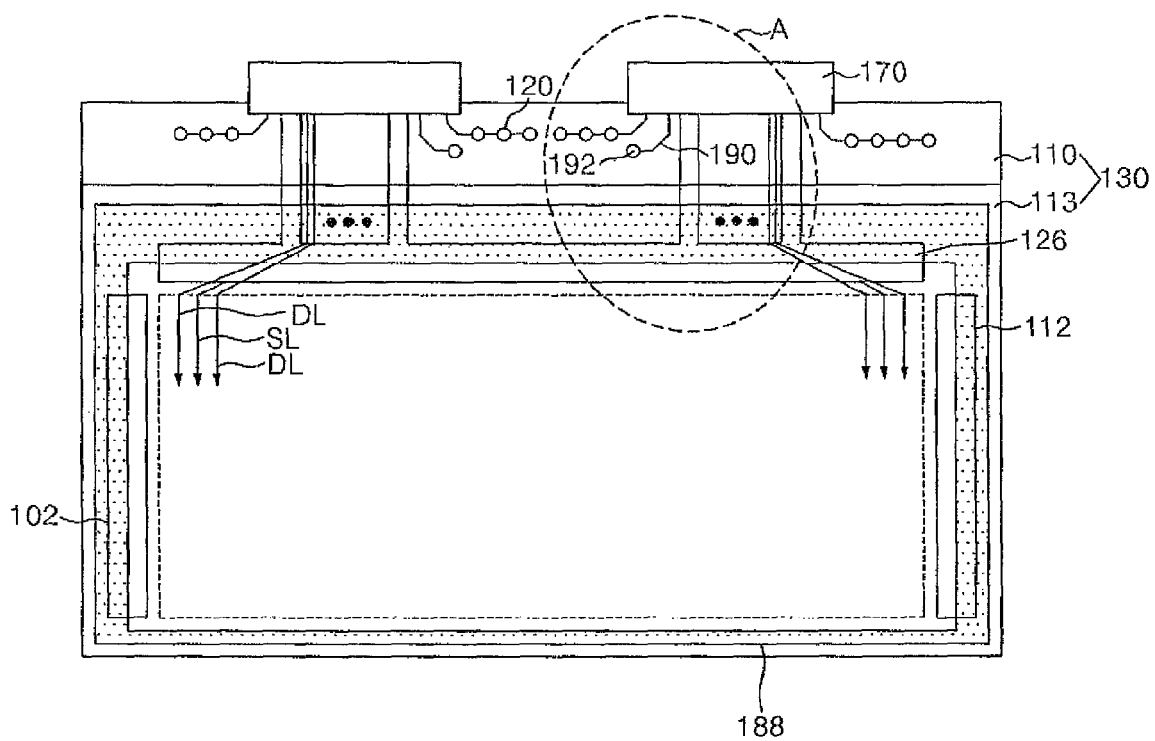
FIG. 7 is a schematic view of an LCD device according to a fourth exemplary embodiment of the present invention.
Figure 8:
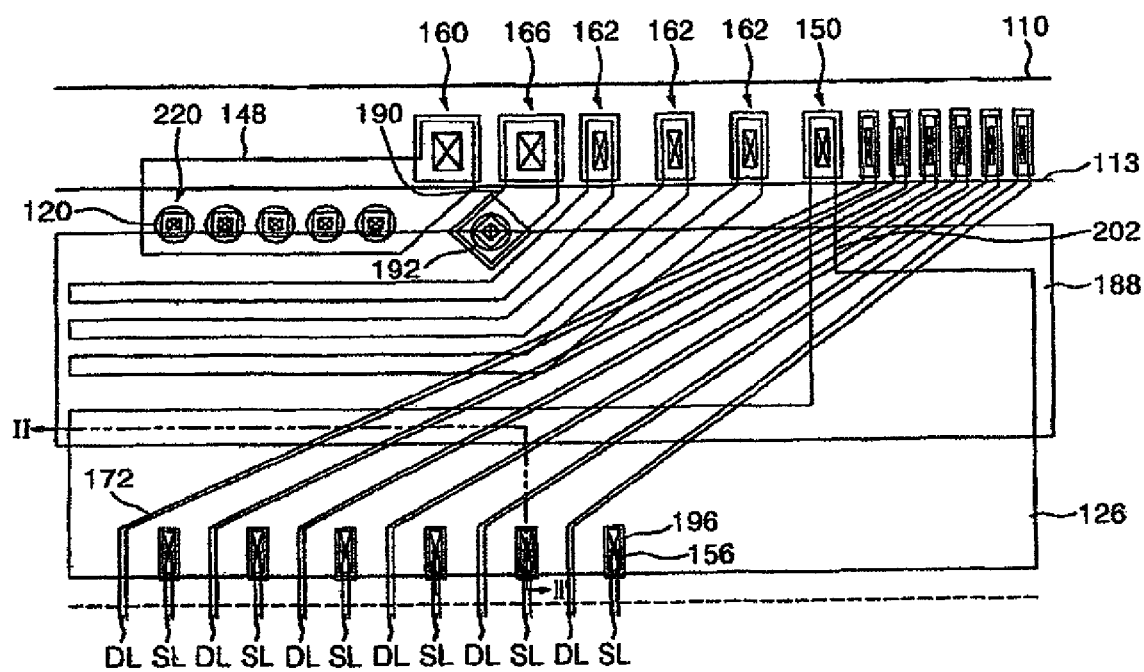
FIG. 8 is an enlarged plan view illustrating a portion 'A' in FIG. 7.

FIG. 7 is a schematic view of an LCD device according to a fourth exemplary embodiment of the present invention. FIG. 8 is an enlarged plan view of a portion 'A' of the LCD device of FIG. 7.

The LCD device shown in FIG. 7 minimizes the variation (distortion) of a voltage of a data signal by supplying a signal having a phase opposite to the common voltage to the storage line according to the degree of distortion of the common voltage by feedback of the common voltage. the LCD device of FIG. 7 has the same elements as the LCD device of FIG. 1, except for: a common voltage pad for supplying a common voltage to a common electrode; a feedback dot and line adjacent to the common voltage pad; and a storage supply line for supplying an opposite phase signal to the storage line according to the degree of distortion of the common voltage. Therefore, a detailed description of the same elements will be omitted.

The common voltage supply line 148, as shown in FIG. 8, connects the common voltage pad 220 to the common voltage input pad 160 connected to the circuit film 170 (FIG. 7) with the shortest distance. The common voltage supply line 148 is formed to have relatively wide width and thus reduces its line resistance. The deviation of the common voltage supplied to the common electrode 158 (see FIG. 4A or FIG. 4B) can be minimized by reducing the resistance of the common voltage supply line 148.

A feedback dot 192 is connected to the circuit film 170 through a feedback pad 166 adjacent to the gate pad 162 via a feedback line 190 (see FIG. 7). The feedback dot 192 is formed to be adjacent to the first conductive spacer(s) 120 and feeds back the common voltage supplied to the common electrode 158 through the first conductive spacer(s) 120. The first conductive spacer(s) 120 and the feedback dot 192 are formed to be adjacent on one side of the same circuit film 170.

The storage supply line 126 overlaps a sealing member 188 (consisting of a glass fiber, etc.) and thus the width of the storage line 126 is relatively wide. For example, the width of the storage supply line 126 is 4 mm to 6 mm. The resistance of the storage supply line 126 is reduced and a deviation of the storage voltage supplied to the storage line SL can be minimized. In this case, a storage connection line 202 is formed in a straight line shape to electrically connect the storage supply line 126 and a storage supply pad 150 to each other with the shortest distance.

Figure 9:
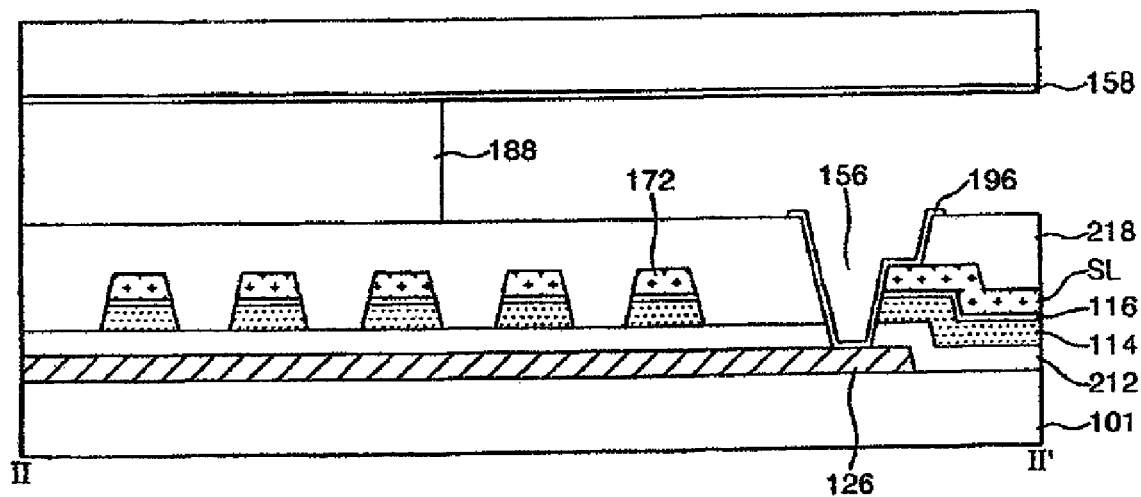
FIG. 9 is a cross-sectional view illustrating the LCD device of FIG. 7 taken along section line II-II' in FIG. 8.

FIG. 9 is a cross-sectional view illustrating the LCD device of FIG. 7 taken along section line II-II' in FIG. 8.

As shown in FIG. 9 (see also FIG. 4A or 4B), the storage supply line 126 is formed of the same metal as the gate line GL on the lower substrate 101, and the data fanout line 172 is formed of the same metal as the data line DL on the gate insulating layer 212 to cross (over) the storage supply line 126. The storage line SL is formed of the same metal as the data line DL on the gate insulating layer 212. The storage line SL and the storage supply line 126 are exposed through a connection contact hole 156 penetrating the passivation layer 218 and the gate insulating layer 212. The exposed storage line SL and the storage supply line 126 are connected to each other through a connection electrode 196.

The passivation layer 218 formed on the data fanout line 172 is formed of a thick organic layer capable of buffering pressure applied onto the sealing member 188 with a thickness of 2 μm or more. If pressure is applied onto the LCD panel (pixel array) 130, the pressure is transmitted (e.g., by the LCD liquid) to the sealing member 188 and as a result a shorting phenomenon may occur between the storage supply line 126 and the data fanout line 172 under the sealing member 188. The sealing member 188 is formed of a material containing an elastic soft spacer in order to prevent the short phenomenon between the data fanout line 172 and the storage supply line 126 due to a shock from the exterior.

Thus, the LCD device according to the present invention forms storage supply line(s) having a relatively wide width by overlapping the sealing member. Therefore, the deviation of the storage voltage can be minimized by reducing the line resistance of the storage supply line.

As described above, the LCD device of the present invention having a structure in which the number of data lines is decreased can compensate for a distortion of the common voltage by the second common voltage pad and the second conductive spacer formed between the fanout lines. In addition, the LCD device of the present invention having a structure in which the number of data lines is decreased can minimize the deviation of the storage voltage by providing storage supply line(s) that overlap the sealing member and have a relatively wide width.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A display device, comprising:
   a first substrate;
   a second substrate facing the first substrate;
   a gate line disposed on the second substrate and extended in a first direction;
   a data line disposed on the second substrate and extended in a second direction different from the first direction;
   a thin film transistor connected to the gate line and to the data line;
   a pixel electrode connected to the thin film transistor;
   a plurality of storage lines disposed along at least one of the first direction and the second direction;
   a first circuit film, a second circuit film, and a third circuit film which comprise a plurality of pads, respectively, wherein the second circuit film is disposed between the first circuit film and the third circuit film;
   a storage supply line connected to at least the second circuit film of the first to third circuit films and at least one of the storage lines.

2. The display device of claim 1, further comprising:
   a common electrode formed on the first substrate,
   a conductive spacer formed on the second substrate, the conductive spacer supplying a common voltage to the common electrode; and
   a feedback dot adjacent to the conductive spacer, the feedback dot feeding back the common voltage.

3. The display device of claim 2, wherein a compensation signal having a phase opposite to the common voltage fed back through the feedback dot is supplied to the storage lines.

4. The display device of claim 2, wherein the conductive spacer and the feedback dot are formed to be adjacent on one side of at least one of the first to third circuit films on which a data driving chip is mounted.

5. The display device of claim 2, wherein the conductive spacer and the feedback dot are formed to be adjacent on one side of a data driving chip mounted on the second substrate.

6. The display device of claim 1, wherein the storage supply line and at least one of the storage lines are connected to each other through a contact hole.

7. The display device of claim 1, wherein the storage supply line is formed of a same metal as the gate line.

8. The display device of claim 1, wherein the storage supply line connects the storage lines with the first to third films.

9. The display device of claim 8, wherein the storage supply line comprises a first to third storage supply line segments, and
   the first to third storage supply line segments are connected to the first to third circuit films, respectively.

10. The display device of claim 9, wherein the storage supply line segments supply different storage voltages to the storage lines.

11. The display device of claim 8, wherein a data driving chip is mounted on each of the first to third circuit films, and
   the pads comprise data driving pads connected to the data driving chip and a storage pad connected to the storage supply line.

12. The display device of claim 11, wherein the storage pad is located at the outermost of the pads.

13. The display device of claim 1, wherein the storage supply line interconnects the storage lines.

14. The display device of claim 1, wherein the storage supply line is overlapped with a sealing member.

15. A liquid crystal display device, comprising:
   a first substrate;
   a common electrode formed on the first substrate;
   a second substrate bonded to the first substrate by sealing member with liquid crystals disposed therebetween;
   a gate line formed on the second substrate;
   a data line formed on the second substrate, the data line intersecting with the gate line;
   a thin film transistor connected to the gate line and to the data line;
   a pixel electrode connected to the thin film transistor and formed in a sub-pixel region having a long side extended in a first direction parallel to the gate line and having a short side extended in a second direction different from the first direction;
   a plurality of storage lines formed along the short side via the sub-pixel region;
   a storage supply line interconnecting the plurality of storage lines;
   a conductive spacer formed on the second substrate, for supplying a common voltage to the common electrode formed on a second substrate; and
   a feedback dot adjacent to the conductive spacer for feeding back the common voltage,
   wherein the conductive spacer and the feedback dot are formed to be adjacent on one side of a circuit film on which a data driving chip is mounted,
   wherein a compensation signal having a phase opposite to the common voltage fed back through the feedback dot is supplied to the storage line.

16. A liquid crystal display device, comprising:
   a first substrate;
   a common electrode formed on the first substrate;
   a second substrate bonded to the first substrate by sealing member with liquid crystals disposed therebetween;
   a gate line formed on the second substrate;
   a data line formed on the second substrate, the data line intersecting with the gate line;
   a thin film transistor connected to the gate line and to the data line;
   a pixel electrode connected to the thin film transistor and formed in a sub-pixel region having a long side extended in a first direction parallel to the gate line and having a short side extended in a second direction different from the first direction;
   a plurality of storage lines formed along the short side via the sub-pixel region;
   a storage supply line interconnecting the plurality of storage lines;
   a conductive spacer formed on the second substrate, for supplying a common voltage to the common electrode formed on a second substrate; and
   a feedback dot adjacent to the conductive spacer for feeding back the common voltage,
   wherein the conductive spacer and the feedback dot are formed to be adjacent on one side of a data driving chip mounted on the second substrate,
   wherein a compensation signal having a phase opposite to the common voltage fed back through the feedback dot is supplied to the storage line.

17. A display device, comprising:
a first substrate;
a second substrate faced with the first substrate;
a plurality of gate lines disposed on the second substrate and extended in a first direction;
a plurality data lines disposed on the second substrate and extended in a second direction different from the first direction;
thin film transistors connected to the gate lines and to the data lines;
pixel electrodes connected to the thin film transistors;
a plurality of storage lines disposed along at least one of the first direction and the second direction;
a first block comprising a first group of data fanout lines;
a second block comprising a second group of data fanout lines, wherein the first and second blocks are disposed adjacent to each other;
a storage supply line connected to at least one of the storage lines and disposed between at least the rightmost data fanout line in the first block and the leftmost data fanout line in the second block.

18. The display device of claim 17, further comprising a storage pad connected to the storage supply line, wherein each of the first and second blocks comprises a plurality of data pads,
the storage pad is disposed between at least the rightmost data pad in the first block and the leftmost data pad in the second block.

19. The display device of claim 18, wherein the rightmost data pad of the data pads of the first block is a pad most adjacent to the second block, and the leftmost data pad of the data pads of the second block is a pad most adjacent to the first block.

20. The display device of claim 17, wherein the storage supply line and at least one of the storage lines are connected to each other through a contact hole.

21. The display device of claim 17, wherein the storage supply line is formed of a same metal as the gate line.

22. The display device of claim 17, wherein the storage supply line interconnects the storage lines.

23. The display device of claim 17, wherein the storage supply line is overlapped with a sealing member.

* * * * *